United States Patent [19]
Imaizumi

[11] Patent Number: 5,673,217
[45] Date of Patent: Sep. 30, 1997

[54] IDEA PROCESSOR

[75] Inventor: Hiroaki Imaizumi, Tokyo, Japan

[73] Assignee: HiroArt Directions, Inc., Tokyo, Japan

[21] Appl. No.: 584,303

[22] Filed: Jan. 11, 1996

[30] Foreign Application Priority Data

Jan. 11, 1995 [JP] Japan ................................. 7-000376

[51] Int. Cl.$^6$ .................................................. G11C 15/00
[52] U.S. Cl. ........................................ 365/49; 395/776
[58] Field of Search ............................... 365/49; 395/776

[56] References Cited

U.S. PATENT DOCUMENTS 5,283,894 2/1994 Deran ........................................ 395/776

*Primary Examiner*—David C. Nelms
*Assistant Examiner*—Trong Quang Phan
*Attorney, Agent, or Firm*—Oblon, Spivak, McClelland, Maier & Neustadt, P.C.

[57] ABSTRACT

In an idea processor, a plurality of sentences are managed in a hierarchical structure having a plurality of levels. Eight or less sentences are developed from a key sentence, and these nine or less sentences are displayed in a nested structure on a screen such that the key sentence is displayed at the center cell of nine cells arranged in a 3×3 matrix, while the developed sentences are displayed in cells that surround the center cell. Since the number of sentences that are developed from the key sentence is limited to eight, the idea processor is easier for a beginner to use, as compared to a conventional idea processor in which the number of sentences that are developed from a key sentence is not limited. Moreover, the nested displayed 3×3 cell structure makes it easier to grasp the entire structure of the sentences on a screen.

5 Claims, 5 Drawing Sheets

Fig. 5

| |
|---|
| ⋮ |
| SB No. : SB4 |
| ORDER: 1 |
| PARENT SB No. : SB1 |
| LOWER ORDER SB Nos: SB41, SB42, SB43, SB44, SB45, SB46, SB47, SB48 |
| DATA OF SENTENCES |
| ⋮ |

| |
|---|
| SB No. : SB4 |
| ORDER: 1 |
| PARENT SB No. : SB1 |
| LOWER ORDER SB Nos: |
| DATA OF SENTENCES |
| |

IDEA PROCESSOR

BACKGROUND OF THE INVENTION

1. Field of the Invention

The present invention relates to an idea processor using a computer.

2. Description of the Related Art

Word processing software is widely used to handle documents on computers. Use of computers for word processing was started relatively early in the development of computers, except for some languages such as Japanese, which requires conversion from "kana" (characters based on the phonetic system) to "kanji" (characters of Chinese origin based on the ideographic system) for word processing.

The advantage in handing documents on a computer is that movement, deletion, and search of sentences can be easily performed, such functions being difficult or impossible on paper. A so-called idea processor has been proposed for creating documents with a word processor, taking advantages of features of a computer.

Although various kinds of idea processors have been made, a typical one controls or manages sentences which are itemized and arranged in a hierarchical structure. Sentences belonging to a lower order can be displayed on a screen and removed therefrom, and sentences are subjected to movement, deletion, and other processing in an item-by-item fashion.

Since the screen of the display of a computer has a limited display area, handling sentences in an item-by-time fashion is quite effective when long sentences are created. This also makes it easier to review the contents of sentences. Such an idea processor in which sentences are hierarchically managed is useful in creating sentences, and has the advantage that the number of items or sentences in each order and the number of orders can be freely determined. However, this freedom sometimes becomes a hurdle for beginners.

For example, in such an idea processor, a user must determine the number of items in a lower order branching from a certain item in the higher order. Also, the user must determine the order to which each item belongs. Although these determinations are not difficult for skilled persons, they are difficult for beginners.

SUMMARY OF THE INVENTION

An object of the present invention is to solve the above-mentioned problems and to provide an improved idea processor which is easy for beginners to use.

The present invention provides an idea processor in which sentences are displayed in units each consisting of nine cells arranged in a 3×3 matrix on a display screen, and sentences are stored in a hierarchical structure. The idea processor provides a first display in which a sentence of a certain order is displayed in the center display cell and sentences of a lower order are displayed in eight display cells surrounding the center display cell, and a second display in which a sentence of the lower order is displayed in the center display cell and sentences of a further lower order are displayed in the eight display cells surrounding the center display cell.

Preferably, switching between the first and second displays is performed using a pointing device such as a mouse.

In the idea processor according to the present invention, a user organize 8 items (or sentences) for each theme. Since the number of items is only eight, which is the maximum number of items that the human can memorize in the brain, it is easy for a beginner to organize his/her concept, idea or thinking. Also, the number of display cells is fixed to nine, and the center display cell in which a theme may appear is surrounded by eight peripheral display cells. Therefore, the relationship between them can be grasped at a glance.

BRIEF DESCRIPTION OF THE DRAWINGS

Various other objects, features and many of the attendant advantages of the present invention will be readily appreciated as the same becomes better understood by referring to the following detailed description of the preferred embodiments when considered in connection with the accompanying drawings, in which:

FIG. 5 is a schematic illustration showing the structure of document data;

DESCRIPTION OF THE PREFERRED EMBODIMENT

An embodiment of the present invention will be described with reference to the accompanying drawings.

Figure 1:
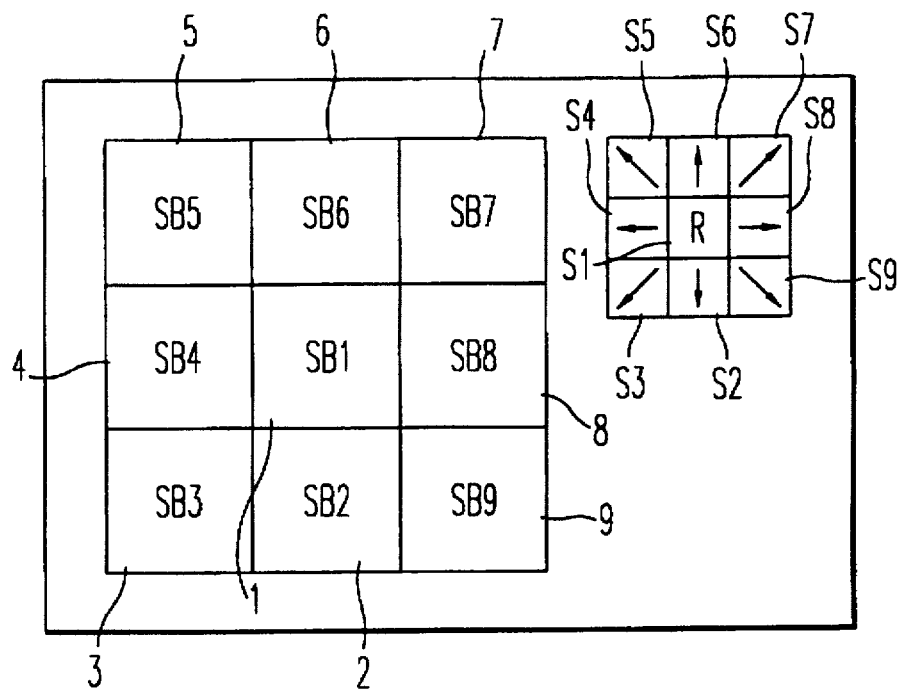
FIGS. 1 and 2 are explanatory charts showing display cells according to an embodiment of the present invention.
Figure 2:
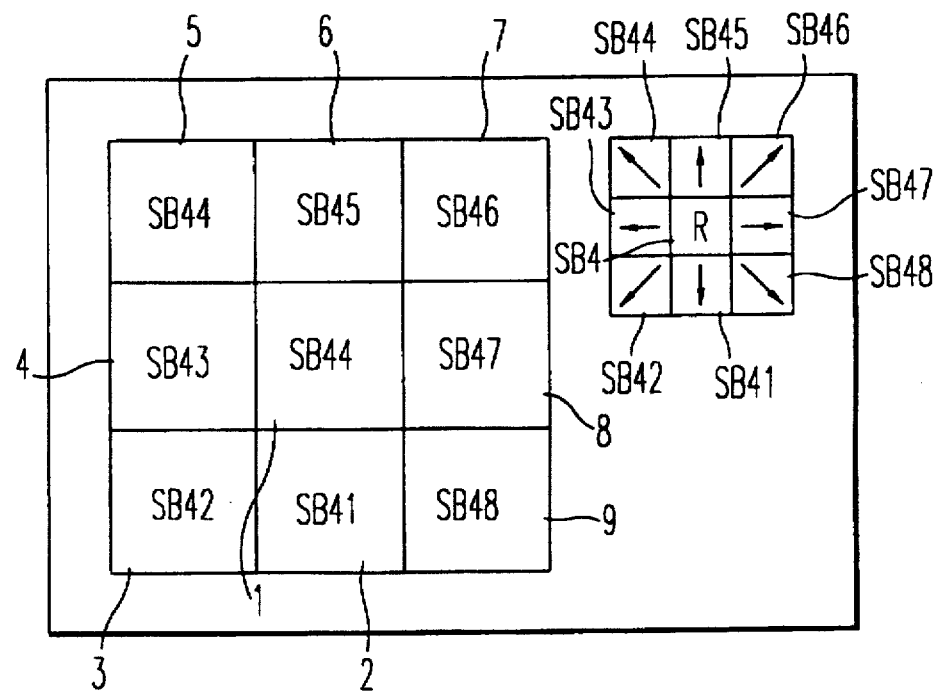

As shown in FIGS. 1 and 2, nine display cells are arranged in a 3×3 matrix on a display. These nine display cells are handled as a unit. The center display cell of the nine cells is used for displaying a sentence or sentences (hereinafter referred to as a "sentence block") of a higher order, and eight cells 2–9 that surround the center cell are used for displaying sentence blocks of a lower order.

When one sentence block SB4 of the sentence blocks of the lower order is selected, a next display is provided in which the selected sentence block SB4 is displayed in the center display cell, and sentence blocks SB41–SB48 of a further lower order are displayed in the eight peripheral display cells 2–9. As described above, the displays are provided in a nested structure.

In this manner, sentences hierarchically stored in a storage device are displayed in the display cells of a 3×3 matrix in which the representative sentence is displayed at the center. Movement, deletion, and other processing can be performed in a cell-by-cell fashion.

A user can naturally create a document having a hierarchical structure simply by inputting a sentence or sentences in the peripheral display cells which relate to the representative sentence display in the center display cell. Also, since the number of cells for a lower order does not exceed 8, sentences having a well-balanced hierarchy can be created.

Sentences which relate to the sentence written in center display cell 1 are input to peripheral display cells. However, the eight peripheral display cells are not required to be completely filled with sentences, and a user may input sentences into a proper number of peripheral display cells.

Figure 3:
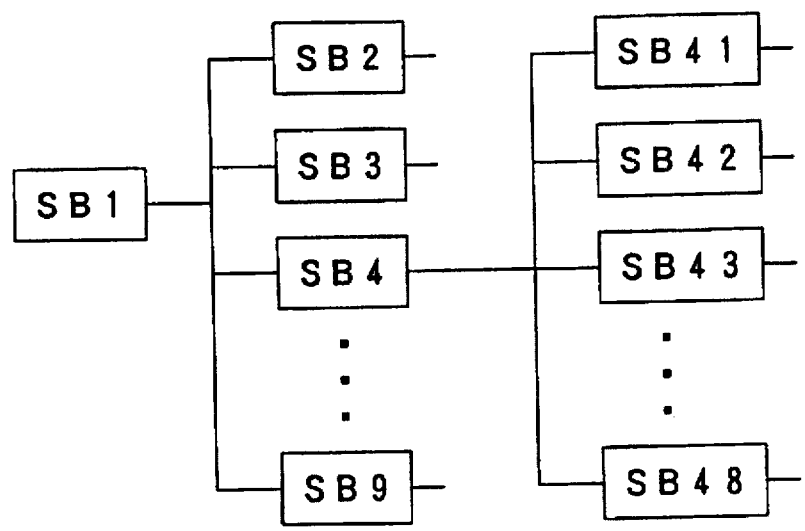
FIG. 3 is an explanatory chart showing a hierarchical structure of sentences.

FIG. 3 shows an example of the hierarchical structure of sentence blocks.

In FIG. 3, sentence SB1 is shown with sentences SB2-SB9 linked thereto at a lower level of a hierarchal structure. At the SB2-SB9 level of the hierarchal structure, sentence SB4 is shown having sentences SB41-SB48 linked thereto in a similar fashion.

Figure 4:
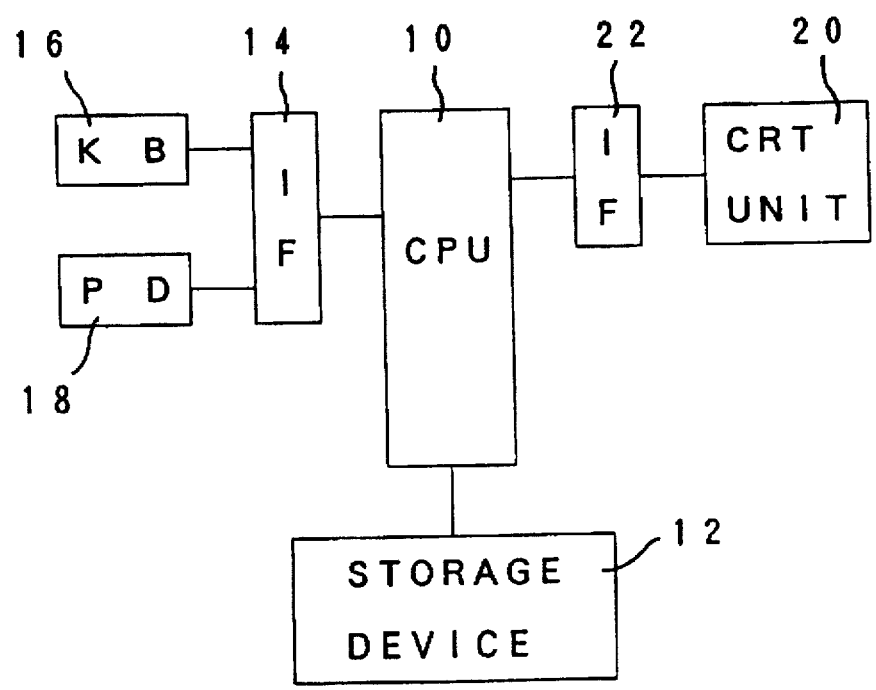
FIG. 4 is a block diagram showing the structure of an idea processor according to the embodiment of the present invention.

FIG. 4 shows the structure of an idea processor according to the embodiment of the present invention.

As shown in FIG. 4, the idea processor can be operated on an ordinary computer that includes a CPU 10 and a storage device 12 for storing a control program and document data. A keyboard 16 and a pointing device 18 such as a mouse are connected to the CPU 10 via an interface 14, and a CRT unit 20 is connected to the CPU 10 via another interface 22.

CPU 10 provides for processing for retrieval and display of sentences stored as document data. Keyboard 16 and pointing device 18 allow the user to make selections and enter data consistent with the description of the invention contained herein. Interface 14 provides connection to and transfer of data from keyboard 16 and pointing device 18 to CPU 10. Interface 22 provides connection and transfer of data from CPU 10 to CRT unit 20.

In the storage device 12, as shown in FIG. 5, each data area includes not only a memory area for storing a sentence or sentences as shown by memory block DATA OF SENTENCES (also shown in FIG. 7), but also memory areas for storing a sentence block number, an order number, a higher order (parent) sentence block number, and up to eight lower order sentence block numbers.

Next, the operation of the idea processor will be described.

As shown in FIGS. 1 and 2, nine selection buttons S1-S9 corresponding to the nine display cells 1-9 are displayed on the right side of the display screen of the CRT unit 20. Buttons with solid arrows are used for displaying sentences of a lower order. The center button labeled "R" is used for returning to the original order. A user operates these buttons by moving a pointer using the mouse 18 and then clicking or depressing a button of the mouse 18.

Initially, the sentence block of the highest order (i.e., order 0) is displayed in the center display cell 1, and the sentence blocks of the order succeeding the highest order (i.e., order 1) are displayed in the peripheral display cells 2-9, as shown in FIG. 1.

Figure 6:
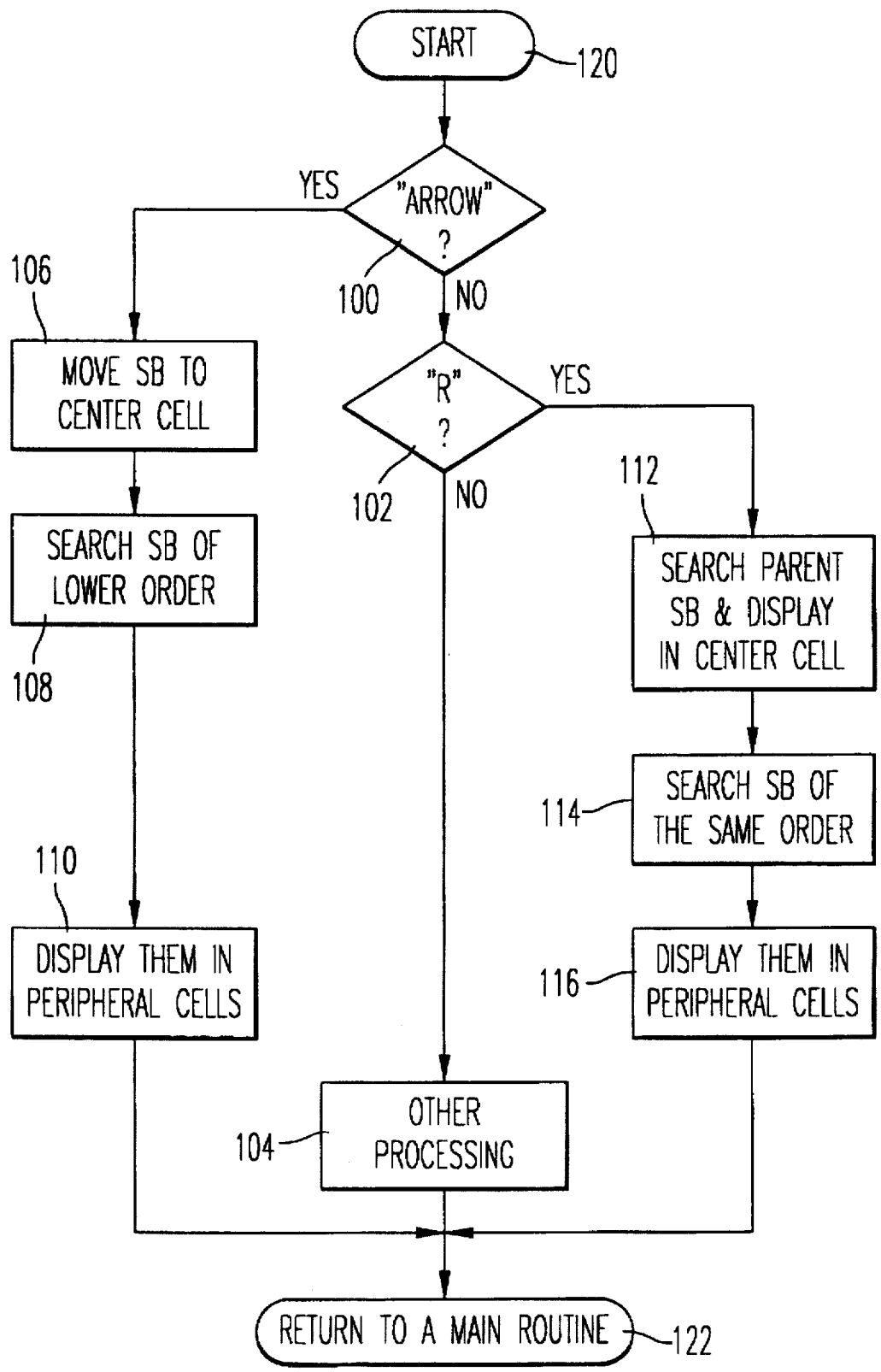
FIG. 6 is a flowchart showing the operation of the CPU shown in FIG. 3.

In response to the operation of the mouse 18, the program shown in FIG. 6 begins execution identified by step 120, START. First, it is decided in step 100 whether any button with an arrow is operated. When an affirmative judgment is made in step 100, the processing moves to step 106 so as to display sentence blocks of a lower order. In step 106, the sentence block displayed in a peripheral display cell corresponding to the operated button is moved to the center display cell 1.

Subsequently, the sentence blocks of the lower order are searched in step 108 and read out from the storage device 12 and then displayed in the peripheral display cells 2-9 in step 110. After that, the processing returns to a main routine at step 122. With this operation, the display shown in FIG. 1 changes as shown in FIG. 2, for example.

In contrast, when a negative judgment is made in step 100, processing moves to step 102 to judge whether the return button labeled as "R" is operated. When an affirmative judgment is made in step 102, the processing moves to step 112. In step 112, a parent sentence block of the sentence block which was displayed in the center display cell 1 is searched and displayed in the center display area 1. In subsequent step 114, sentence blocks of the same order as that of the sentence block which was displayed in the center display cell are searched. The searched sentence blocks are displayed in the peripheral display areas 2-9 in step 116. With this operation, the display shown in FIG. 2 changes as shown in FIG. 1. When a negative judgment is made in step 102, processing moves to step 104 to perform other kinds of processing (Description regarding RET).

Figures 7, 8:
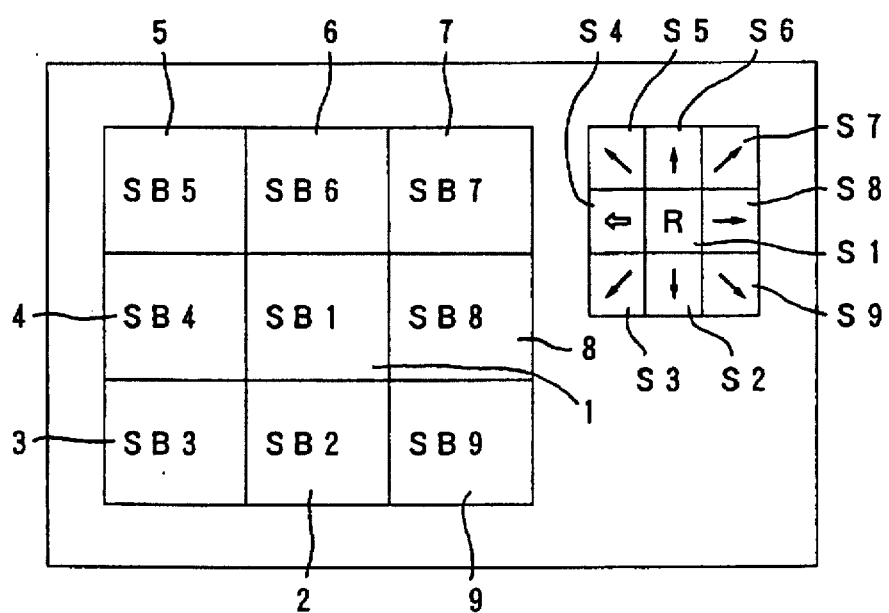
FIG. 7 is a schematic illustration showing the data area for sentence block SB4 in the case where the sentence block SB4 has no lower order sentence block.
FIG. 8 is an explanatory chart showing a display in the case where the sentence block SB4 has no lower order sentence block.

In the above-described steps 110 and 116, it is checked whether each searched sentence block has lower order sentence blocks, and the manner of display of the selection buttons with arrows is changed. For example, if the sentence block SB4 has no lower order sentence block, the data area corresponding to the sentence block SB4 stores no lower order sentence block numbers, as shown in FIG. 7. In such a case, the selection button S4 corresponding to the peripheral display cell 4 in which the sentence block SB4 is displayed is changed such that the selection button S3 has a white arrow, as shown in FIG. 8. Accordingly, a user can find by viewing the selection buttons whether each of searched sentence blocks has lower order sentence blocks. This eliminates a useless operation.

Obviously, numerous modifications and variations of the present invention are possible in light of the above teachings. It is therefore to be understood that within the scope of the appended claims, the present invention may be practiced other than as specifically described herein.

What is claimed is:

1. An idea processor in which a plurality of sentences are managed in a hierarchical structure having a plurality of levels by developing a plurality of sentences from a key sentence, wherein the number of sentences that are developed from the key sentence is limited to eight, and these nine sentences are displayed on a screen such that the key sentence is displayed at the center cell of nine cells arranged in a 3×3 matrix, while the developed sentences are displayed in cells that surround the center cell, thereby providing a display having a nested structure.

2. A method of managing and displaying sentences in an idea processor, comprising the steps of:

managing a plurality of sentence blocks in a hierarchical structure having a plurality of levels such that up to eight developed sentence blocks are hierarchically linked to any other sentence block;

maintaining a first 3×3 matrix having a center cell and eight peripheral cells on a display screen, each cell capable of displaying a sentence block; and displaying a nested structure of said sentences, including displaying a sentence block as a key sentence block at said center cell of said 3×3 matrix, and displaying up to eight sentence blocks developed from said sentence block displayed as a key sentence block, one developed sentence block each in a peripheral cell so that developed sentences surround said center cell.

3. The method as claimed in claim 1, further comprising the step of:

maintaining a second 3×3 matrix having nine cells, each cell corresponding to a respective sentence block contained in a cell having a similar matrix position in said first 3×3 matrix and displaying navigation information regarding each respective sentence block.

4. The method as claimed in claim 3, further comprising the steps of:

navigating said plurality of sentence blocks in a hierarchical structure by selecting a cell in said second 3×3 matrix;

moving up said hierarchical structure, if the selected cell corresponds to the sentence block displayed at said center cell, such that the sentence block displayed at said center cell is replaced by its parent sentence block and up to eight sentence blocks developed from and hierarchically linked to said parent sentence block are displayed in said peripheral cells; and moving down said hierarchical structure, if the selected cell corresponds to one of said peripheral cells, by displaying a sentence block corresponding to the selected cell as a key sentence block is said center cell and up to eight sentence blocks developed from and hierarchically linked to said sentence block corresponding to the selected cell are displayed in said peripheral cells.

5. The method of claim 4, wherein said navigation information includes whether or not a displayed sentence block is hierarchically linked to other sentence blocks.

* * * * *